United States Patent [19]

Kyonomine

[11] 4,181,834
[45] Jan. 1, 1980

[54] PEDAL STOPPER PARKING BRAKE SWITCH

[75] Inventor: Masaru Kyonomine, Toyota, Japan

[73] Assignee: Toyota Jidosha Kogyo Kabushiki Kaisha, Aichi, Japan

[21] Appl. No.: 851,720

[22] Filed: Nov. 15, 1977

[30] Foreign Application Priority Data

Nov. 16, 1976 [JP] Japan .......................... 51-153741[U]

[51] Int. Cl.² ............................................. H01H 3/14
[52] U.S. Cl. .................................. 200/61.89; 200/295
[58] Field of Search ............... 200/61.81, 61.82, 61.85, 200/61.87, 61.88, 61.89, 86.5, 295, 302, 306, 330, 331, 332; 340/69, 70, 71

[56] References Cited

U.S. PATENT DOCUMENTS

| | | | |
|---|---|---|---|
| 2,451,176 | 10/1948 | Schellman | 200/302 |
| 2,812,402 | 11/1957 | Dixon | 200/86.5 |
| 2,870,300 | 1/1959 | Morse | 200/306 X |
| 3,115,559 | 12/1963 | Cass et al. | 200/295 X |
| 3,172,981 | 3/1965 | Loesch | 200/302 X |
| 3,246,112 | 4/1966 | Adams et al. | 200/302 |
| 3,404,246 | 10/1968 | Stimpson | 200/61.89 |
| 3,411,134 | 11/1968 | Shumes | 200/61.89 X |
| 3,462,964 | 8/1969 | Haroldson | 200/61.89 X |
| 3,982,089 | 9/1976 | Hyltin | 200/302 X |
| 4,021,630 | 5/1977 | Taylor | 200/302 X |

FOREIGN PATENT DOCUMENTS

W 16872  3/1956  Fed. Rep. of Germany ........ 200/61.89

Primary Examiner—James R. Scott
Attorney, Agent, or Firm—Stevens, Davis, Miller & Mosher

[57] ABSTRACT

A pedal stopper incorporating a parking switch therein, which can be actuated by the release of the compressed deformation of a resilient material constituting the proper portion of the pedal stopper deformable by compression due to an urging action of the pedal and able to regulate the rotative movement of the pedal. It enables mounting of both the pedal stopper and the parking switch on a single bracket. It has improved the durability of the parking switch as well as the absorbability of impact from the pedalling operation.

4 Claims, 3 Drawing Figures

PEDAL STOPPER PARKING BRAKE SWITCH

BACKGROUND OF THE INVENTION

This invention relates to a pedal stopper in a footdepress type parking brake. More particularly, it relates to simplification of the pedal mechanism and improvement of the durability of the parking switch and others by means of incorporating a parking switch in the pedal stopper and constructing the pedal stopper structure such that the parking switch is actuated due to the compression deformation of the proper portion of the pedal stopper caused by the pedal depression.

There has been, among parking brakes used for vehicles to be stopped or parked, a foot-depress type one in addition to the ordinary manual type. Such a foot-depress type parking brake is used in a similar way to the ordinary brake pedal as by actuating the brake by means of depressing a pedal by foot; and this type parking brake is provided with a pedal stopper for regulating the rotative movement of a pedal and a parking switch connected to a signal means for telling the actuation of the parking brake to the driver. In the conventional foot-depress type parking brake mechanism, the abovementioned pedal stopper and parking switch are respectively located at an individual place, which requires a proper bracket respectively for mounting each. Besides, various inevitable troubles have been accompanying to this sort of parking brake such as: (a) since the action of the parking switch is caused by the release of urging action (contact) onto the actuator of the urging plate of steel disposed on the pedal, the tip of the actuator is liable to be worn due to an inter-metallic contact between the urging plate and the actuator; (b) an overdeflection of the pedal stopper often causes an overurging of the urging plate onto the parking switch, with a subsequent result of deformation of the switch mounting bracket and the switch itself, leading sometime to damage of the same.

SUMMARY OF THE INVENTION

This invention has been made with such a background in view. It is therefore an object of this invention to combine a parking switch and a pedal stopper into a single unit thereby simplifying the mounting or assemblying thereof.

It is another object of this invention to improve the durability of the switch and to provide a novel pedal stopper incorporating a parking switch which is able to softly absorb the pedal impact while the pedal is stopped in a depressed state.

The gist of the feature of this stopper resides in that the same is made of a resilient material deformable by being urged with the pedal, and includes a pedal stopper proper portion regulating the rotative movement of the pedal and a parking switch, located in the pedal stopper, to be actuated by the release of the pedal stopper proper portion from a compressively deformed state caused by depressing of the pedal.

DETAILED DESCRIPTION OF A PREFERRED EMBODIMENT

The invention will be described in detail with a reference to the drawings of a preferred embodiment.

Figure 1:
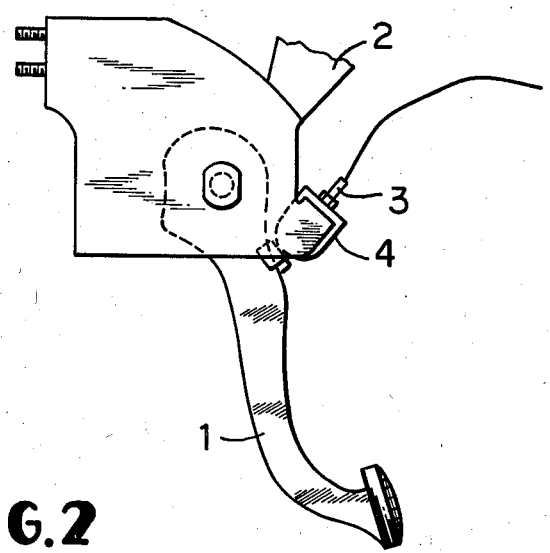
FIG. 1 is an explanatory view of a pedal mechanism provided with a pedal stopper.

In FIG. 1, the numeral 1 designates a parking pedal, and 2 is a parking bracket for mounting the pedal 1 to a vehicle, which bracket 2 is provided with a pedal stopper 4 incorporating a parking switch 3 therein.

Figure 2:
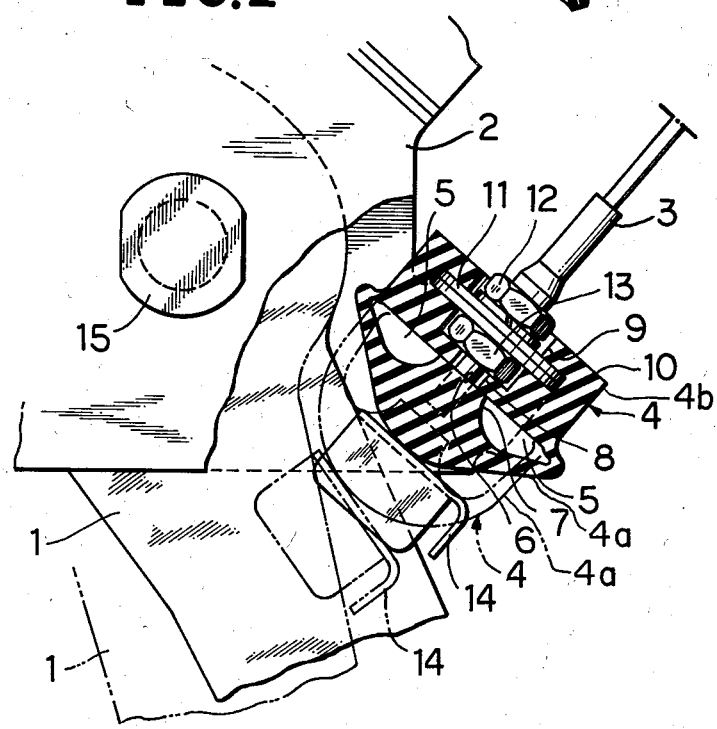
FIG. 2 is an enlarged fragmentary cross-section of the pedal stopper of FIG. 1, partly broken away.
Figure 3:
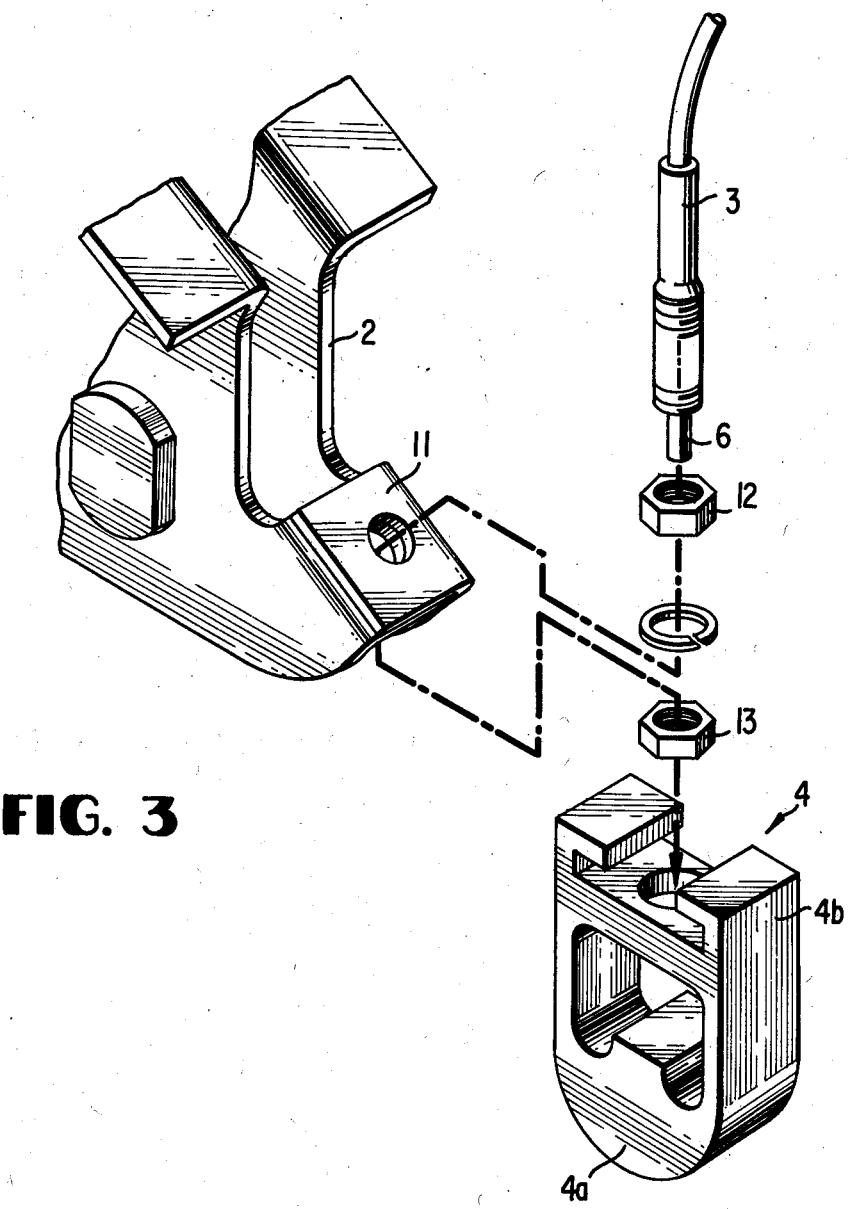
FIG. 3 is a perspective view of the pedal stopper disassembled.

When the pedal 1 is depressed, the pedal stopper 4, due to an emancipation from the compressively deformed state caused by the urging force of the pedal 1, will be returned to its original configuration, as shown with two-dot chain lines in FIG. 2, aided by the elasticity of the constituting material (natural or synthetic rubber or the like) of the same 4. This returning of the pedal stopper 4 to the original configuration, that is the emancipation of the compressed deformation will cause the actuation of the parking switch according to the construction thereof so designed.

FIG. 2 illustrates a specific example of a pedal stopper 4, which is of closed U letter shape in cross-section hereinafter called U-shape section and consists of a U-shaped curvature portion 4a and a rectangular body portion 4b, one side of a rectangle being projected in a semicircular form, and made of a resilient material, which stopper embraces a hollow or vacant portion 5 therein extending in a perpendicular direction in the Figure. A parking switch 3 is insertedly mounted in a hole 9 which is normally formed on the opposite surface 10 from the U-shaped curvature portion 4a and is open to the atmosphere ambient, and secured to a mounting plate 11 fitted in the stopper 4 for mounting the same on the parking bracket 2 with nuts 12, 13.

An actuator 6 constituting the tip portion of the parking switch 3 is constantly biased by a means mounted within the switch itself for being able to protrude into the vacant portion 5 through a communicating bore 8 linking the bottom of the hole 9 and the vacant portion 5, which protruding of the actuator 6 into the vacant portion 5 will actuate the parking switch 3 with a subsequent act on a signal means telling the parking operation.

The U-shaped curvature portion 4a of the pedal stopper 4 is normally urged by an urging plate 14 secured to the pedal 1, while the parking brake is in a non-operating state, by which urging is the U-shaped curvature portion 4a of the stopper 4, including the vacant portion 5, compressed to change the configuration thereof to that shown in FIG. 2 with the solid line by discharging the air in it. The actuator 6 is therefore, against the protruding force thereof, restricted to the non-operating state. When the pedal 1 is depressed in order to actuate the parking brake, the restriction by the urging plate 14 will be released to emancipate the compressed deformation of the pedal stopper 4, which will in turn allow the stopper 4 returning to the original configuration by inhaling the air thereinto, as shown with two-dot chain lines in FIG. 2, due to the elasticity of the same. The abovementioned returning of the stopper to the original configuration will release the compressed deformation of the U-shaped curvature portion 4a, and subsequently allow the actuator 6 to protrude into the vacant portion 5 through the communicating bore 8 with the result of actuating the parking switch 3. The numeral 15 represents a supporting shaft for the pedal 1. On the U-shaped curvature portion 4a of the pedal stopper 4 is disposed a projection 7 protruding into the vacant portion 5 for confronting to the actuator 6 with the object of securely transmitting the urging action of the urging plate 14 to the actuator 6. Contact between the tip of the projection 7 and the surface of the stopper body portion 4b around the communicating bore 8 facing the vacant portion 5 serves to arrest a further deformation of the U-shaped curvature portion 4a of the stopper 4, thereby allowing the stopper 4 to sufficiently sustain the urging force of the pedal 1, while the same is in a released condition configuration illustrated with the solid line in FIG. 2.

The advantages enumerable about this embodiment will be summed up hereunder. The parking switch incorporated in the pedal stopper 4 allows favorable employing of a common bracket for mounting the both. The traditionally embarassed problems caused by wearing of the actuator have been completely eliminated, because the actuator 6 is not directly contacted with the urging plate 14 of the pedal 1 but receives the urging action of the pedal 1 through an elastic body of the pedal stopper 4, especially the projection 7, and because the parking switch is actuated or deactuated by the imparting and releasing of the urging action of the elastic body ingeniously conceived.

The durability of the parking switch has been far and away improved. The disposition of the vacant portion 5 within the pedal stopper 4, in this embodiment, serves to effectively absorb and mitigate the impact imparted to the pedal stopper 4, through the compressed deformation of the vacant portion 5 caused by the pedal 1 when released and returned to the original position from the depressed state; that is, when the parking brake is released from the depressed condition.

Still some more comments will be described for clarifying the modified embodiments.

The pedal stopper is most preferably made of an elastic body as a single structure, but is not limited to that assemblying way. For example, a portion where sustains a compressive deformation and a portion where a parking switch is located may be favorably separated; the sectional configuration is not confined to the U-shape, either, but may be rectangular, circular, etc. The parking switch is not limited to the type wherein the actuation and deactuation is carried out by the reciprocation of the actuator. Various known switches, which are actuated by the compressed deformation of the pedal stopper, may be applicable for the purpose. According to the kinds of the switch, the internal structure of the pedal stopper may be properly arranged.

As a conclusion this invention can be characterized in a few words as follows:

By incorporating a parking switch in a pedal stopper, and by utilizing the compressed deformation of the pedal stopper, through a pedalling operation, for actuating the parking switch, (a) the pedal stopper and the parking switch can be mounted on a single bracket, (b) the durability of the parking switch is greatly improved, and the impact of the pedalling can be softly absorbed.

It will be obvious to those skilled in the art that various changes may be made without departing from the scope of the invention and the invention is not to be considered limited to what is shown in the drawings and described in the specification.

What is claimed is:

1. A pedal stopper mechanism used in a footdepress type parking brake comprising:
   a pedal for actuating, with depressing thereof, a parking brake;
   a pedal stopper, composed of a body portion having a rectangular shape and a U-shaped curvature portion, both being in a cross section and being integrally formed of a resilient material, said body portion being attached to a mounting bracket, which is extended from a parking bracket, for retaining said body portion, said U-shaped curvature portion having in a hollow portion formed therein a projection protruding toward the inner surface of said body portion, whereby said U-shaped curvature portion is normally deformed compressively by the urging action of said pedal as far as the tip portion of said projection comes in abutment on said body portion so as to restrict a further proceeding of said urging action of said pedal, and, when said pedal is depressed to be moved in a reversed direction of said urging action by the depress of said pedal, can be restored to the original U-shape due to the elasticity of the resilient material which forms said U-shaped curvature portion; and
   a parking switch disposed within said body portion of said pedal stopper and so constructed as to be actuated by the reciprocation of an actuator, said actuator piercing through said body portion to protrude into said hollow portion to be confronted with said projection, for being pushed, while said U-shaped curvature portion is being deformed, back into said body portion due to the urging of said projection and, when the urging by said projection is released, protruded into said hollow portion to actuate said parking switch.

2. A pedal stopper mechanism in accordance with claim 1 further comprising an urging plate attached to said pedal, whereby the urging action of said pedal is transmitted, via said urging plate, to said U-shaped curvature portion of said pedal stopper.

3. A pedal stopper mechanism in accordance with claim 1, wherein said resilient material is natural rubber.

4. A pedal stopper mechanism in accordance with claim 1, wherein said resilient material is synthetic rubber.

* * * * *